(12) United States Patent
Ford et al.

(10) Patent No.: US 8,075,013 B2
(45) Date of Patent: Dec. 13, 2011

(54) MOUNTING APPARATUS

(76) Inventors: Steven Ford, Ellensburg, WA (US);
Aaron Roe, Cle Elum, WA (US)

( * ) Notice: Subject to any disclaimer, the term of this patent is extended or adjusted under 35 U.S.C. 154(b) by 0 days.

(21) Appl. No.: 12/540,167

(22) Filed: Aug. 12, 2009

(65) Prior Publication Data

US 2010/0038881 A1 Feb. 18, 2010

Related U.S. Application Data

(60) Provisional application No. 61/088,669, filed on Aug. 13, 2008, provisional application No. 61/171,910, filed on Apr. 23, 2009, provisional application No. 61/171,905, filed on Apr. 23, 2009.

(51) Int. Cl.
*B60F 5/00* (2006.01)
(52) U.S. Cl. .................. 280/415.1; 280/438.1; 280/402; 280/433
(58) Field of Classification Search .............. 280/415.1, 280/416.1, 417.1, 418.1, 441.1, 441.2, 402, 280/433; 414/563
See application file for complete search history.

(56) References Cited

U.S. PATENT DOCUMENTS

| | | | |
|---|---|---|---|
| 3,715,042 A | | 2/1973 | Rellinger |
| 5,040,815 A | * | 8/1991 | Evans ........................ 280/425.2 |
| 5,845,920 A | * | 12/1998 | Hill ............................... 280/402 |
| 5,988,664 A | * | 11/1999 | Hill ............................... 280/402 |
| 6,036,428 A | * | 3/2000 | Kooima ........................ 414/563 |
| 7,100,933 B2 | | 9/2006 | Zackovich et al. |
| 7,611,159 B2 | * | 11/2009 | Schuettenberg .............. 280/402 |
| 7,637,524 B2 | * | 12/2009 | Schuettenberg .............. 280/402 |
| 7,740,265 B2 | * | 6/2010 | Lundin ....................... 280/476.1 |
| 7,857,343 B2 | * | 12/2010 | Gipson ........................ 280/441.2 |
| 2002/0159873 A1 | * | 10/2002 | Amos et al. .................... 414/563 |

OTHER PUBLICATIONS

"Holmes FW-25 5th Wheel Unit," Publication No. 88469, Catalog, Holmes International, Inc., distributed as early as 1983, United States.
"Holmes FW-25 Towing Device Operation & Service," Publication No. 81-302 (1-81 Edition), Owner's Manual, Dover Corporation/Ernest Holmes Division, distributed as early as 1981, United States.
"Operation & Service Holmes Towing Device FW-35," Publication No. 81-309, Owner's Manual, Dover Corporation/Ernest Holmes Division, Mar. 1983, United States.

(Continued)

*Primary Examiner* — Tony H. Winner
(74) *Attorney, Agent, or Firm* — DWC Law Firm, P.S.; David Chen

(57) ABSTRACT

Described are embodiments directed to an apparatus that is adapted to be mounted on a vehicle with a fifth wheel. The apparatus allows a towing hitch to be attached to the vehicle which allows the vehicle to tow other vehicles. The apparatus includes an elongated beam with a forward portion, middle portion, and rearward portion and a kingpin connected to the middle portion of the beam and adapted to engage a fifth wheel. A mounting pin with a first end and a second end is connected to the rearward portion of the beam and is substantially perpendicular to the elongated beam. The apparatus further includes strut braces connected to either end of the mounting pin and that extend at an angle away from the mounting pin. The strut braces are also connected to leveling assemblies which are adapted to connect to a frame of the vehicle and are adapted to change the vertical position of the rearward portion of the beam.

18 Claims, 9 Drawing Sheets

OTHER PUBLICATIONS

"Holmes FW-20 Wrecker Operation & Service," Publication No. 73-115, Rev. 6-74, Owner's Manual, Dover Corporation/Ernest Holmes Division, distributed as early as 1974, United States.

"The Holmes FW-20 5th Wheel Wrecker Unit," Publication No. 73-117, Catalog, Ernest Holmes Company, distributed as early as 1983, United States.

* cited by examiner

US 8,075,013 B2

MOUNTING APPARATUS

CROSS-REFERENCE TO RELATED APPLICATIONS

The present application claims priority to U.S. Provisional Patent Application Nos. 61/088,669 (filed Aug. 13, 2009); 61/171,910 (filed Apr. 23, 2009); and 61/171,905 (filed Apr. 23, 2009) each of which are hereby incorporated by reference in their entirety as if set forth herein in full.

BACKGROUND

Conventional tow trucks are designed to lift and tow a vehicle (e.g., an automobile) in a known manner. The disadvantage of a conventional tow truck is that it is specialized only for towing vehicles. Instead of tow trucks, specialized vehicles, such as a tractor trailer, are used to pull trailers for purposes such as transport of goods and other items. These specialized vehicles have a device known as a "fifth wheel" to permit coupling to a trailer in a conventional fashion. The trailer is equipped with a kingpin that engages with the fifth wheel. In normal operation, a significant downward force is applied to the fifth wheel by the weight of the trailer under tow and the contents, if any, of the trailer.

Past attempts have been made to provide a towing vehicle that is capable of operation as a normal tow truck (i.e., lifting and towing a vehicle) as well as operation with a fifth wheel. Such devices are disclosed by way of example in U.S. Pat. Nos. 5,823,735 and 6,036,428. In those references, a towing adapter is attached to the fifth wheel of the tow vehicle. That is, an adapter is mounted on the tow vehicle and coupled to the tow vehicle's fifth wheel to permit the tow vehicle to operate as a conventional tow truck. This technique allows the tow vehicle to be used both for conventional towing and for towing a trailer via the fifth wheel.

However, because of the position of the kingpin in devices disclosed in the noted patents, a mechanism needs to be implemented to prevent upward force from being applied to the fifth wheel. As a result, some of the disclosed devices include link members coupled between the towing frame and the vehicle frame to resist upward force of the kingpin with respect to the fifth wheel. In some embodiments the link members are made from chains and binders. When the frame twists or moves from side to side, the link members on one side tighten and the link members on the other side slack. The side to side movement results in the chains used as the link members breaking.

It is with respect to these and other considerations that embodiments of the present invention have been made. Also, although relatively specific problems have been discussed, it should be understood that embodiments of the present invention should not be limited to solving the specific problems identified in the background.

SUMMARY

This summary is not intended to identify key features or essential features of the claimed subject matter and should not be used to narrow the scope of the claimed subject matter. This summary is provided only to generally provide a description of some of the embodiments of the present invention.

Described below are embodiments directed to an apparatus that is adapted to be mounted on a vehicle with a fifth wheel. The apparatus allows a towing hitch to be attached to the vehicle which allows the vehicle to tow other vehicles. The apparatus includes an elongated beam with a forward portion, middle portion, and rearward portion and a kingpin connected to the middle portion of the beam and adapted to engage a fifth wheel. A mounting pin with a first end and a second end is connected to the rearward portion of the beam and is substantially perpendicular to the elongated beam. The apparatus further includes strut braces connected to either end of the mounting pin and that extend at an angle away from the mounting pin. The strut braces are also connected to leveling assemblies which are adapted to connect to a frame of the vehicle and are adapted to change the vertical position of the rearward portion of the beam.

BRIEF DESCRIPTION OF THE DRAWINGS

Non-limiting and non-exhaustive embodiments are described with reference to the following figures.

DETAILED DESCRIPTION

Various embodiments are described more fully below with reference to the accompanying drawings, which form a part hereof, and which show specific embodiments. However, embodiments may be implemented in many different forms and should not be construed as limited to the embodiments set forth herein; rather, these embodiments are provided so that this disclosure will be thorough and complete, and will fully convey the scope of the subject matter to those skilled in the art. The following detailed description is, therefore, not to be taken in a limiting sense.

Figure 1:
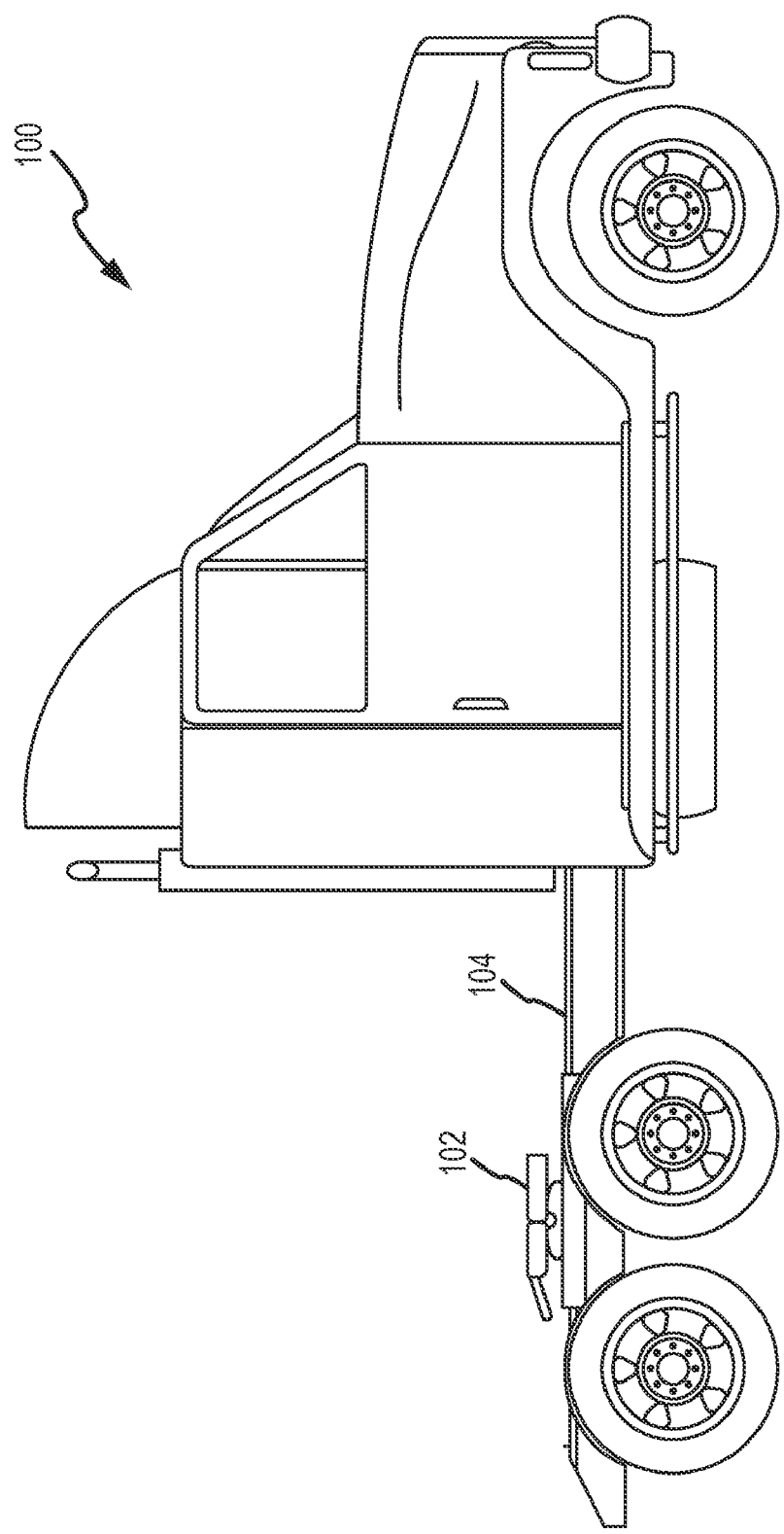
FIG. 1 is a side view of a vehicle with a fifth wheel that may be used with embodiments of the present invention.

FIG. 1 shows a side view of a vehicle 100 with a fifth wheel 102 and a frame 104. Although not shown in FIG. 1, frame 104 may include a number of parts including two parallel frame members extending backward from the cab of vehicle 100 and a number of cross members connecting the two parallel frame members.

Vehicle 100 is conventionally used for pulling trailers of cargo that are attached to the vehicle 100 using fifth wheel 102. Embodiments of the present invention can be attached to vehicle 100 to allow vehicle 100 to, in addition to pulling trailers of cargo, be adapted to receive a tow hitch for towing other vehicles. As described in detail below, embodiments attach to the fifth wheel 102 and frame 104 and have features that provide flexibility in the locations at which the embodiments are attached to frame 104.

It should be appreciated that vehicle 100 is merely one example of a vehicle on which embodiments described herein can be attached. As those with skill in the art will appreciate, vehicle 100 may be for example a pickup truck or other vehicle that has a fifth wheel.

Figure 2:
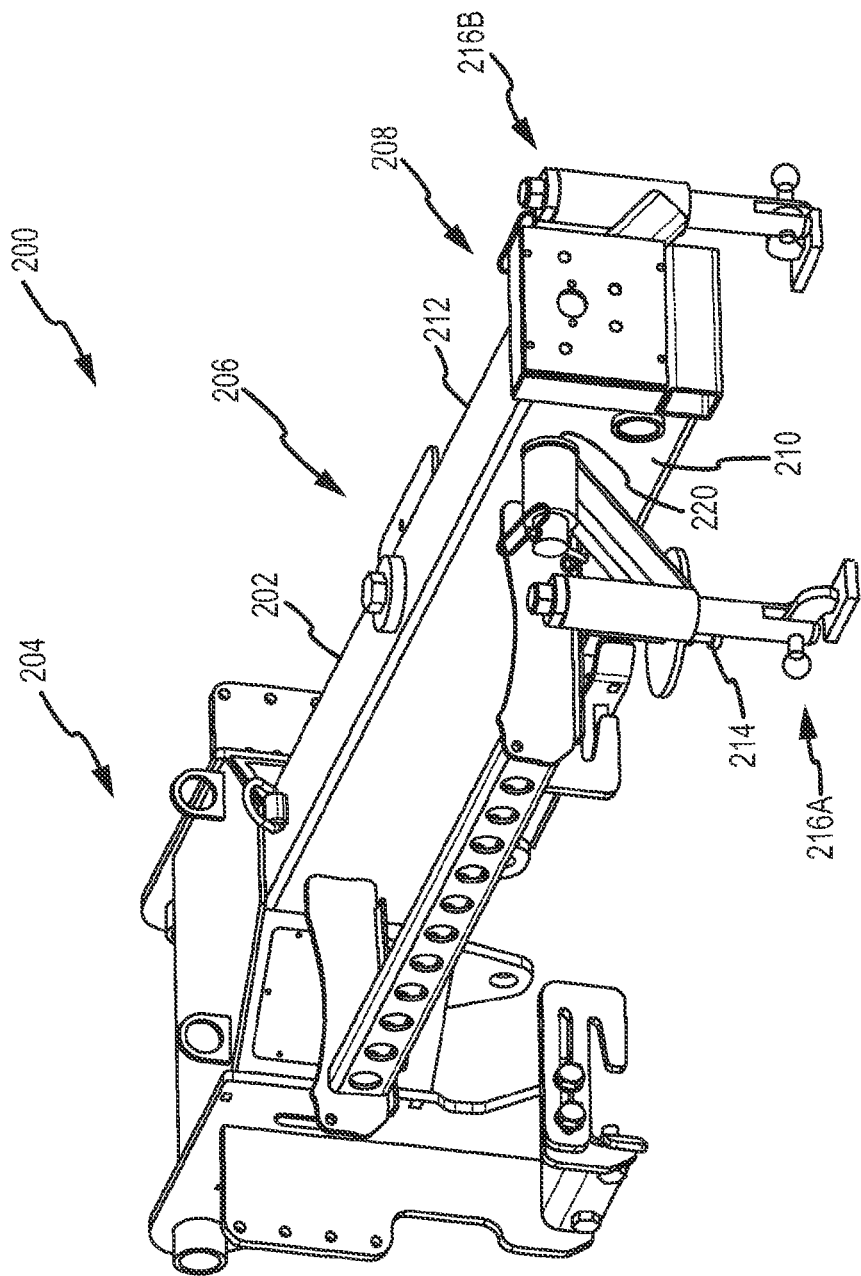
FIG. 2 is a perspective view of an apparatus with strut braces for attaching to a vehicle with a fifth wheel in accordance with an embodiment of the present invention.

FIG. 2 shows a perspective view of an apparatus 200 in accordance with one embodiment of the present invention. As shown in FIG. 2, apparatus 200 includes a beam 202 that has a forward portion 204, a middle portion 206, and a rearward portion 208. The beam 202 also includes a first side surface 210 and a second side surface 212. Apparatus 200 is adapted to be connected to a vehicle that has a fifth wheel. In embodiments, a tow hitch can then be connected to apparatus 200 to allow the vehicle to tow other vehicles.

A kingpin 214 is connected to the middle portion 206 of beam 202. Kingpin 214 is adapted to be connected to a fifth wheel. The position of kingpin 214, i.e., connected to middle portion 206, provides advantages to apparatus 200 particularly when used as an adapter for a tow hitch. As those with skill the art will appreciate a fifth wheel is designed for operation with a trailer that exerts a downward force on the fifth wheel, but is not designed to accommodate upward forces. When apparatus 200 is used with a tow hitch, the tow hitch and vehicles attached to the tow hitch exert a downward force on rearward portion 208. Because the kingpin 214 is connected to the middle portion 206 of beam 202, the kingpin 214 acts as a fulcrum. As such, downward forces are applied to the kingpin 214 and consequently any fifth wheel connected to kingpin 214. In embodiments, the horizontal and/or vertical position of kingpin 214 may be adjusted.

Other conventional designs (such as disclosed in U.S. Pat. Nos. 6,036,428 and 5,823,735), which include a kingpin at the forward portion of an apparatus, create an upward force on the kingpin and consequently the fifth wheel connected to the kingpin. This requires the use of link members to resist the upward force. As shown in FIG. 2, apparatus 200 does not require such link members because of the location of kingpin 214.

Apparatus 200 also includes a pair of connecting assemblies 216A and 216B. The connecting assemblies 216A and 216B are used to connect the apparatus 200 to the frame of a vehicle. As described in further detail below, features of the connecting assemblies 216A and 216B provide flexibility with respect to the locations where the connecting assemblies 216A and 216B are connected to the frame of a vehicle.

Figure 3:
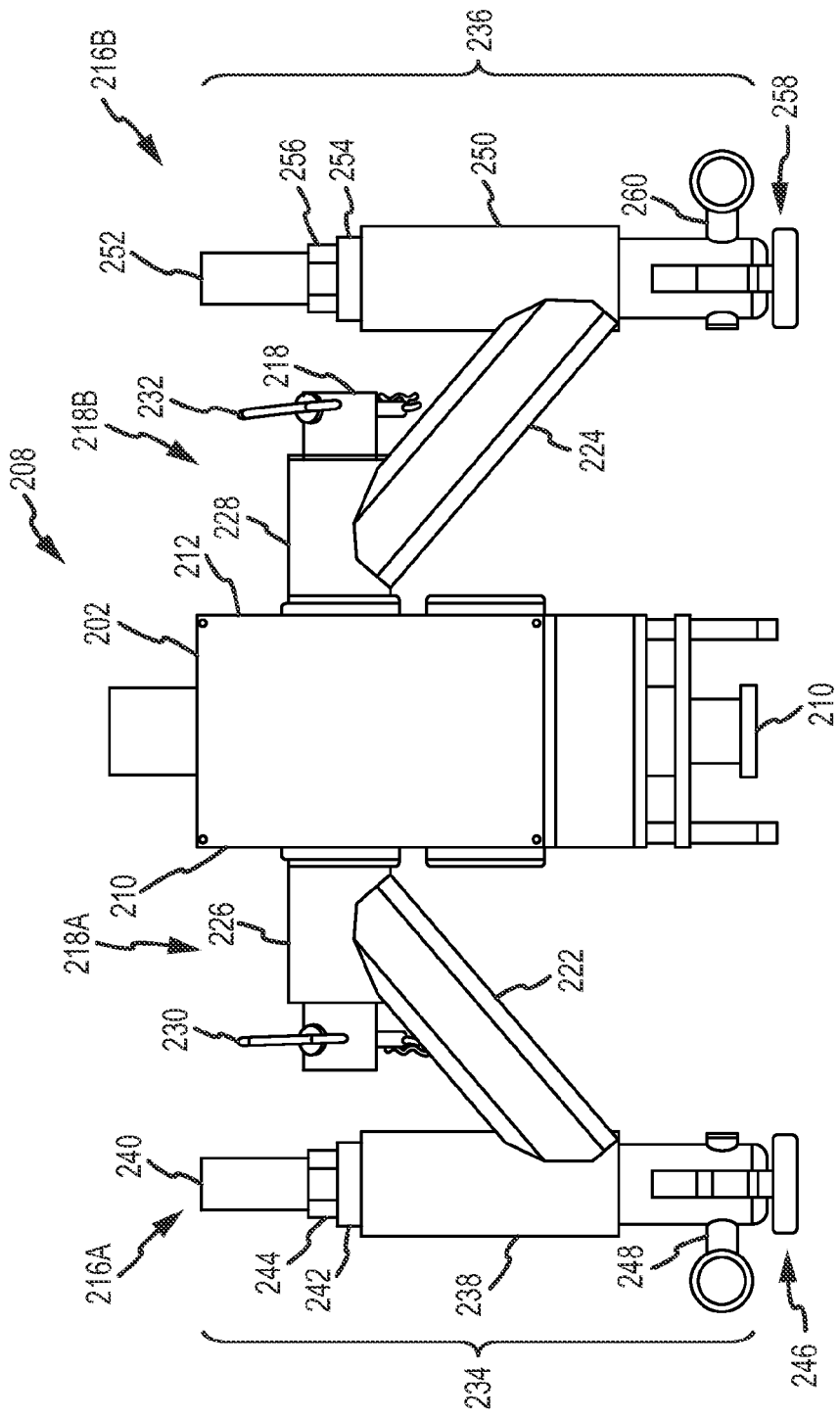
FIG. 3 is a back view of the embodiment shown in FIG. 2.

FIG. 3 shows a back view of apparatus 200 shown in FIG. 2. As shown in FIG. 3, apparatus 200 includes a mounting pin 218 connected to the back portion 208 of beam 202. The mounting pin 218 is substantially perpendicular to the beam 202. In the embodiment shown in FIGS. 2 and 3, the back portion 208 of beam 202 includes a hole 220. The mounting pin 218 is connected to the back portion 208 of beam 202 by being position within hole 220. As will be appreciated by those with skill in the art, in other embodiments, mounting pin 218 may be connected to the back portion 208 of beam 202 using some other mechanism, e.g., mounting brackets connected to back portion 208.

FIG. 3 also shows strut braces 222 and 224 of connecting assemblies 216A and 216B respectively. On a first end, strut brace 222 is connected to a first collar 226. As shown in FIG. 3, a first end 218A of mounting pin 218 is positioned within first collar 226, which connects strut brace 222 to mounting pin 218. Strut brace 224 is connected to a second collar 228. A second end 218B of mounting pin 218 is positioned within second collar 228, which connects strut brace 224 to mounting pin 218.

First end 218A of mounting pin 218 includes a hole in which a first hitch pin 230 is positioned to secure first collar 226 to first end 218A. First hitch pin 230 prevents collar 226 from sliding off of mounting pin 218. Second end 218B of mounting pin 218 also includes a hole in which a second hitch pin 232 is positioned to secure second collar 228 to second end 218B. Second hitch pin 232 prevents collar 228 from sliding off of mounting pin 218.

A second end of strut brace 222 is connected to a leveling assembly 234, while a second end of strut brace 224 is attached to leveling assembly 236. As described in further detail below, the leveling assemblies 234 and 236 can be adjusted to change the vertical position of the rearward portion 208 of beam 202.

One feature of the embodiment of apparatus 200 illustrated in FIG. 3 is the angle at which strut braces 222 and 224 are positioned. As shown in FIG. 3, strut braces 222 and 224 are positioned at an angle and extend away from their respective collars (226 and 228) to which they are connected. The position of strut braces 222 and 224, at an angle, provides clearance for the fifth wheel on a vehicle when apparatus 200 is fully assembled and is being mounted on the vehicle.

In the embodiment shown in FIG. 3, leveling assembly 234 includes a first sleeve 238 connected to a second end of strut brace 222. Leveling assembly 234 also includes a first leveling pin 240 positioned within sleeve 238 and extending vertically from a first end to a second end. A first leveling spanner 242 is connected to leveling pin 240. In one embodiment, first leveling pin 240 includes thread that engages thread within first spanner 242. Accordingly, when first leveling spanner 242 is rotated the vertical position of first leveling pin 240 is changed. A locking nut 244 is also connected to leveling pin 240 and in embodiments includes thread that engages thread on leveling pin 240. Locking nut 244 is used to lock and maintain the vertical position of first leveling pin 240.

Leveling assembly 234 also includes a frame tab 246. Frame tab 246 is connected to a second end of first leveling pin 240. In the embodiment shown in FIG. 3, the frame tab 246 is connected to the second end of leveling pin 240 with a first tab pin 248. As can be seen in FIG. 3, the second end of leveling pin 240 and the first frame tab 246 each include a hole within which the first tab pin 248 is positioned. In embodiments, the first frame tab 246 is rotatable about the first tab pin 248.

Leveling assembly 236 is similar to assembly 234 and includes a second sleeve 250 connected to a second end of strut brace 224. Leveling assembly 236 also includes a second leveling pin 252 positioned within sleeve 250 and extending vertically from a first end to a second end. A second leveling spanner 254 is connected to leveling pin 252. In one embodiment, second leveling pin 250 includes thread that engages thread within second spanner 254. When second leveling spanner 254 is rotated the vertical position of second leveling pin 252 is changed. A locking nut 256 is also connected to second leveling pin 252 and in embodiments includes thread that engages thread on leveling pin 252. Locking nut 256 is used to lock and maintain the vertical position of second leveling pin 252.

Leveling assembly 236 also includes a frame tab 258. Frame tab 258 is connected to a second end of second leveling pin 252. In the embodiment shown in FIG. 3, the frame tab 258 is connected to the second end of leveling pin 240 with a second tab pin 260. As can be seen in FIG. 3, the second end of leveling pin 252 and the second frame tab 258 each include a hole within which the second tab pin 260 is positioned. In embodiments, the second frame tab is rotatable about the second tab pin 260.

Figure 4:
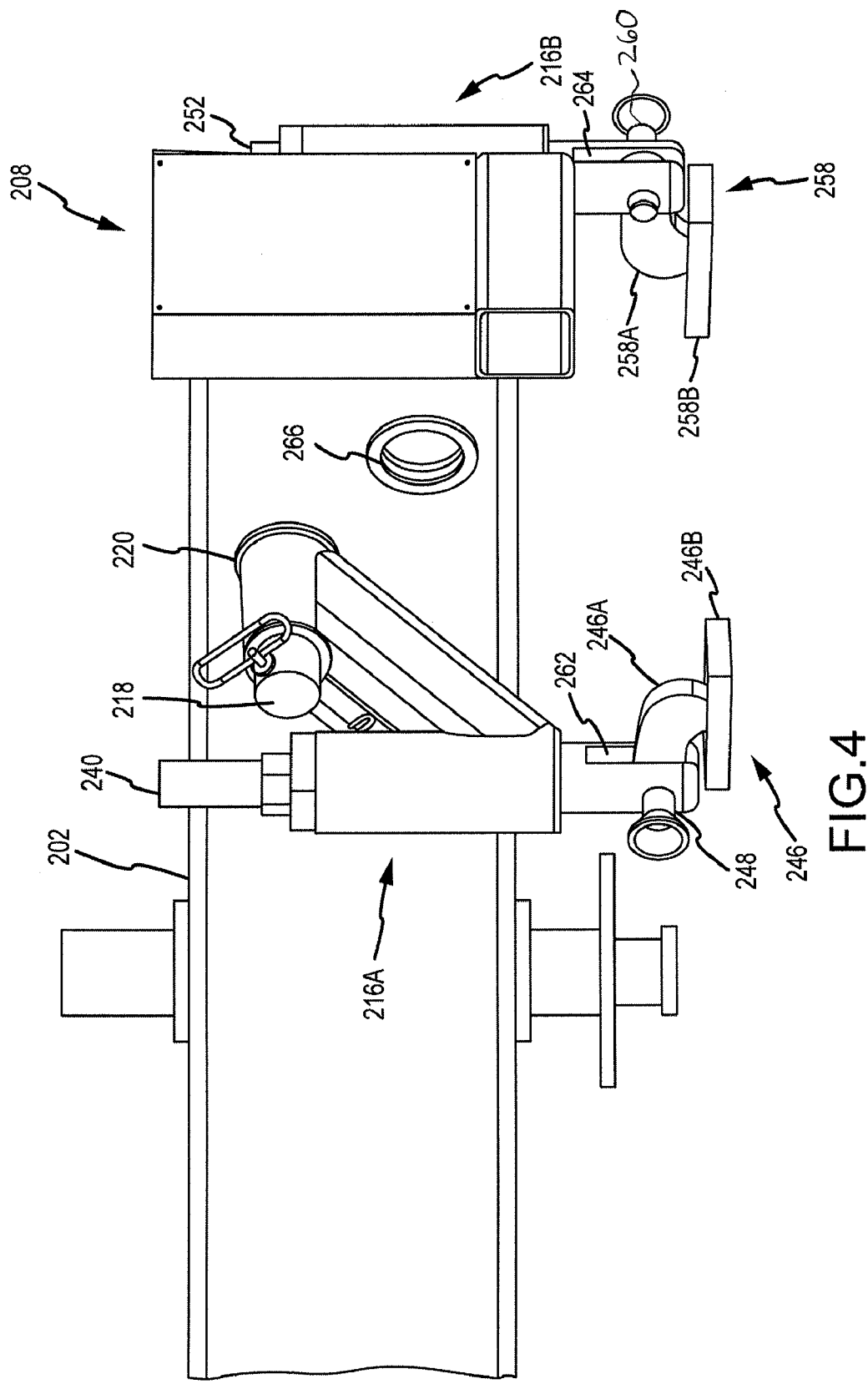
FIG. 4 is a different perspective view of the embodiment shown in FIG. 2.

FIG. 4 shows another perspective view of apparatus 200. FIG. 4 better illustrates the frame tabs 246 and 258 included as part of the embodiment of apparatus 200 shown in FIGS. 2 and 3. As shown in FIG. 4, first frame tab 246 includes a first vertical plate 246A attached to a first horizontal plate 246B. First vertical plate 246A includes a hole (not shown) within which tab pin 248 is positioned to connect frame tab 246 to a second end of leveling pin 240. Also shown in FIG. 4 is a notch 262 in the second end of leveling pin 240. In the embodiment shown in FIG. 4, notch 262 is located substantially in the center of the second end of leveling pin 240. Vertical plate 246A is positioned within notch 262, which provides room for vertical plate 246A to rotate about tab pin 248. In other embodiments, notch 262 may not be in the center of the second end of leveling pin 240, but rather may be located to one side.

Similar to first frame tab 246, second frame tab 258 includes a second vertical plate 258A attached to a second horizontal plate 258B. Second vertical plate 258A includes a hole (not shown) within which tab pin 260 is positioned to connect frame tab 258 to a second end of leveling pin 252. The second end of leveling pin 252 includes a notch 264. In the embodiment shown in FIG. 4, notch 264 is located substantially in the center of the second end of leveling pin 252. Vertical plate 258A is positioned within notch 264, which provides room for vertical plate 258A to rotate about tab pin 260. In other embodiments, notch 264 may not be in the center of the second end of leveling pin 252, but rather may be located on the side. As will be appreciated by those of skill in the art, in other embodiments the frame tabs 246 and 258 may be attached to the leveling pins 240 and 252 in other ways in addition to, or instead of, tab pins 248 and 260 as shown in FIG. 4.

Also shown in FIG. 4 is a second hole 266 in rearward portion 208 of beam 202. In embodiments, mounting pin 218 is positioned within hole 266 instead of hole 220. As can be seen in FIG. 4 positioning mounting pin 218 within hole 266 changes the vertical location of the mounting pin, the connection assemblies 216A and 216B, and the rearward portion 208 of beam 202.

In embodiments, apparatus 200 is attached to a vehicle frame using the horizontal plates 246B and 258B of frame tabs 246 and 258. In one embodiment, U-bolts are positioned around the horizontal plates 246B and 258B and around portions of a vehicle frame. In other embodiments, horizontal plates 246B and 258B may include holes through which bolts can be positioned for attaching to the vehicle frame. As those with skill in the art will appreciate these are merely some examples of how frame tabs 246 and 258 may be attached to a vehicle frame.

Figure 5:
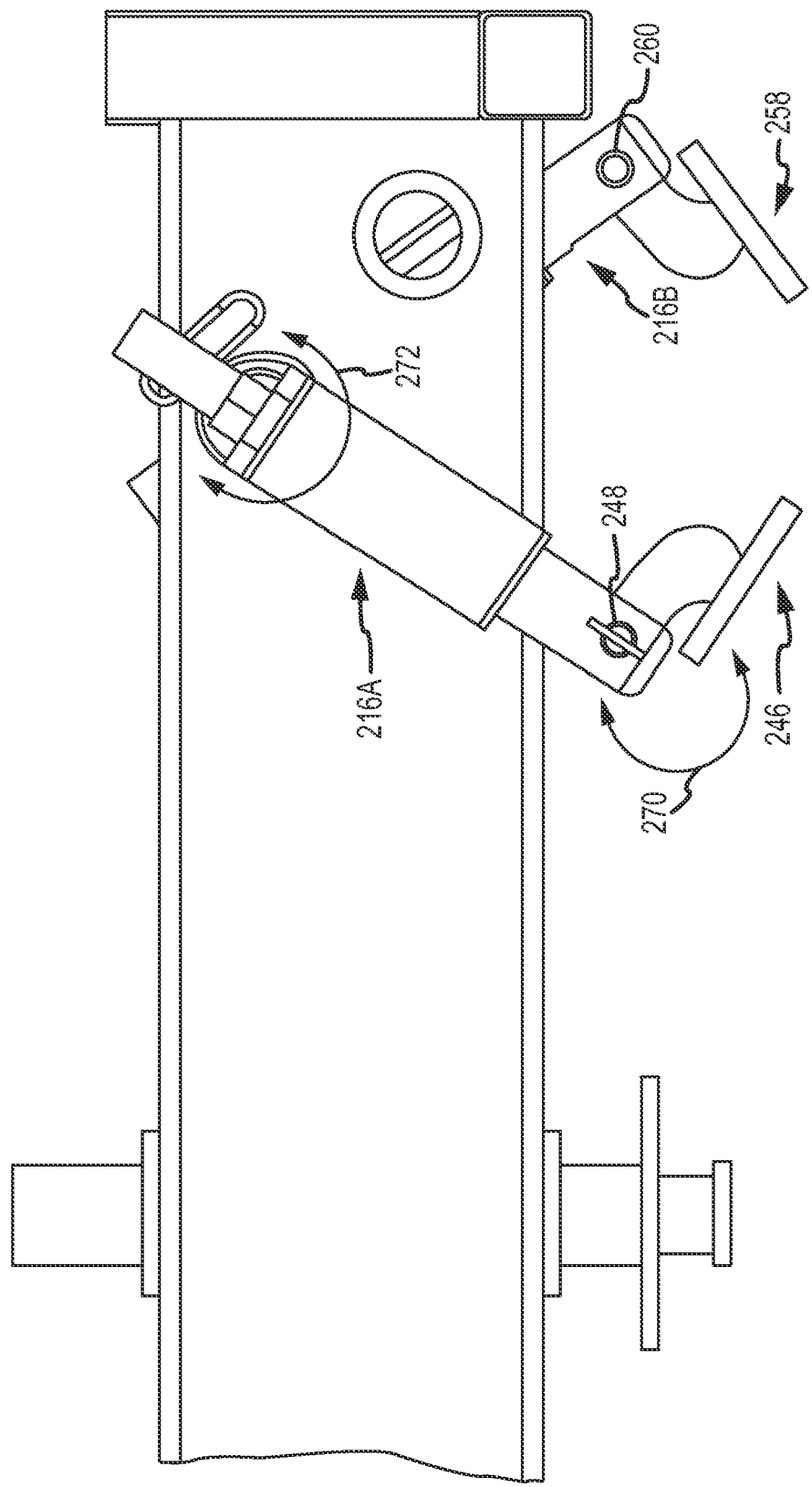
FIG. 5 is a side view of the embodiment shown in FIG. 2 showing the rotation of the strut braces.

FIG. 5 illustrates some features of apparatus 200, namely the rotation of frame tabs 246 and 258 and the connection assemblies 216A and 216B. Frame tabs 246 and 258, as shown in FIG. 5, rotate about tab pins 248 and 260 respectively generally as shown by the arrow 270. The connection assemblies 216A and 216B rotate about the mounting pin 218 as shown generally by arrow 272.

As those with skill in the art will appreciate, truck frames have a number of obstructions such as fuel tanks, spring hangers, fender mounting brackets, and air hanger brackets. The locations of these obstructions are not standardized and are located in different places on different vehicles. As such, it is difficult to standardize the location at which devices are connected to vehicle frames. With other conventional devices (such as disclosed in U.S. Pat. Nos. 6,036,428 and 5,823,735) the location of a device may have to be changed to a less ideal location because of these obstructions.

In contrast, the embodiment of apparatus 200 shown in FIGS. 2-5 provides flexibility in the locations at which apparatus 200 is mounted to a vehicle frame, e.g., 104 (FIG. 1). For example, for frames that have different widths, a longer or shorter mounting pin 218 can be used. A longer mounting pin 218 can be selected for those frames that are wider, consequently connecting assemblies 216A and 216B will be spread wider apart. In some embodiments, some spacers (between collar 226 and first side surface 210 and collar 228 and second side surface 212 may be used to maintain a constant width between 216A and 216B. A shorter mounting pin 218 can be used for those frames that are narrower.

In addition to frame widths, apparatus 200 also provides flexibility by allowing the vertical position of the rearward portion 208 of beam 202 to be changed. As noted above, leveling assemblies 234 and 236 can be used to adjust the vertical height of back portion 208. The height of each leveling assembly can be independently selected and changed using leveling spanners 244 and 256 to change the vertical height of leveling pins 240 and 252. This allows rearward portion 208 to be leveled even if a frame is bent up on one side or if one side of the frame includes obstructions such as mounting brackets or bolts.

Furthermore, the vertical position of rearward portion 208 can also be changed by changing the location where the mounting pin 218 is attached to rearward portion 208. As indicated above, with respect to FIG. 4, rearward portion 208 may include a number of different holes (e.g., 220 and 266) each of which is located at a different vertical height position. Mounting pin 218 can be positioned in a different one of the holes to change the vertical position of the rearward portion 208 with respect to the frame of a vehicle.

Additional mounting flexibility is provided by the connecting assemblies 216A and 216B being able to rotate about the mounting pin 218 and the frame tabs 246 and 258 being able to rotate about the tab pins 248 and 260, as shown in FIG. 5. This allows flexibility in both the vertical position of rearward portion 208 and the lateral location of where frame tabs 246 and 258 are attached to a vehicle frame. By rotating connecting assemblies 216A and 216B and frame tabs 246 and 258, the lateral position of horizontal plates 246B and 258B can be changed and still allow the horizontal plates 246B and 258B to remain reasonably flat for attaching to a vehicle frame. Thus, as those with skill in the art will appreciate the embodiment of apparatus 200 shown in FIGS. 2-5 provides significant flexibility in attaching apparatus 200 to a vehicle frame.

Figure 6:
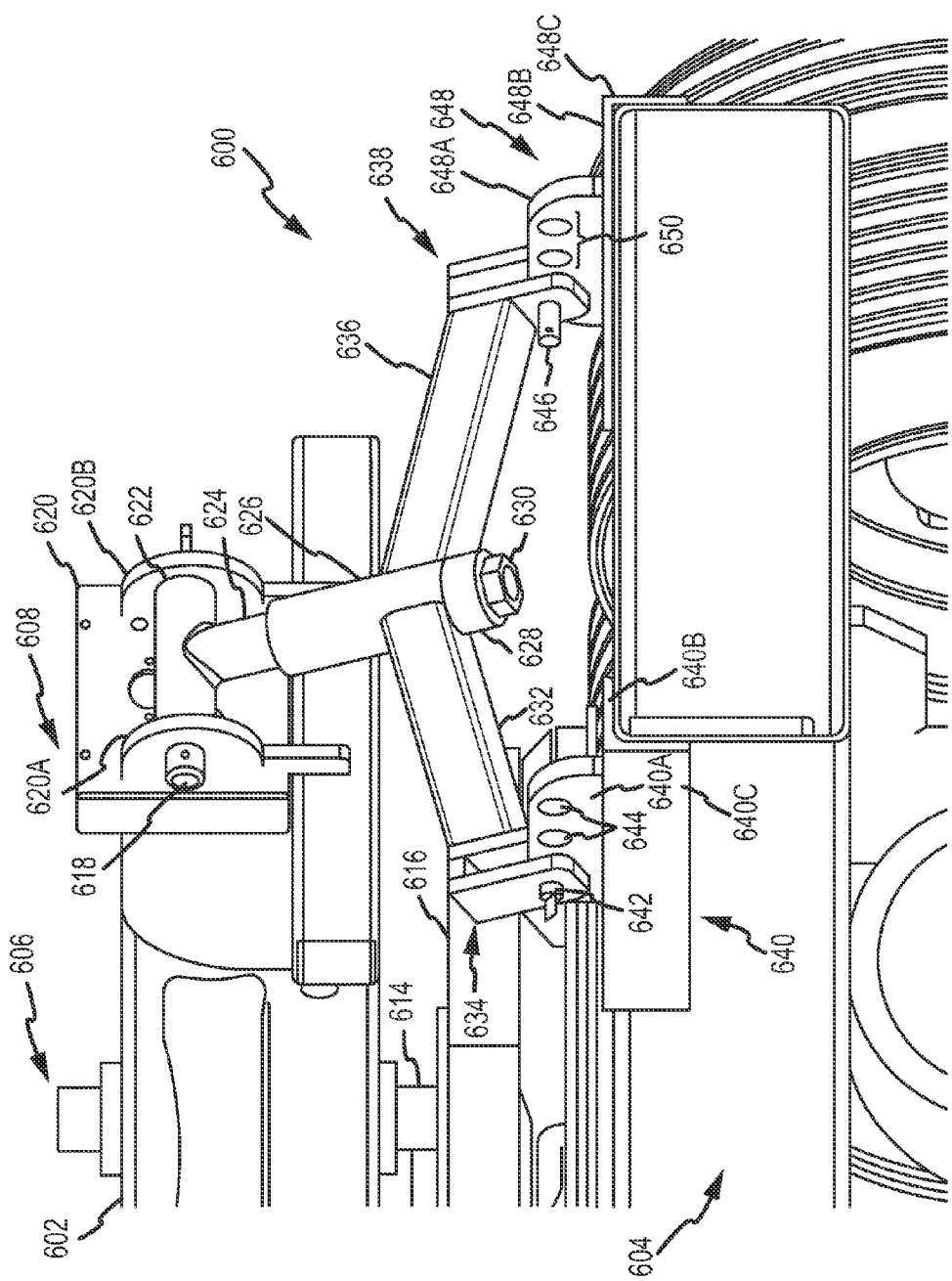
FIG. 6 is a perspective view of an apparatus with strut braces for attaching to a vehicle with a fifth wheel in accordance with a second embodiment of the present invention.

FIG. 6 illustrates a perspective view of an apparatus 600 in accordance with the second embodiment of the present invention. Apparatus 600 includes a beam 602 with a frontward portion (not shown), middle portion 606, and rearward portion 608. Apparatus 600 also includes a kingpin 614 which is attached to the middle portion 606 of beam 602. FIG. 6 is shown mounted on a vehicle frame 604 with the kingpin 614 engaged with a fifth wheel 616. In embodiments, a tow hitch can be connected to apparatus 600 to allow the vehicle to tow other vehicles.

Apparatus 600 includes a mounting pin 618 that is connected to the rearward portion 608 of beam 602. Mounting pin 618 is substantially perpendicular to beam 602. In the embodiment shown in FIG. 6, mounting pin 618 is connected to rearward portion 608 of beam 602 using a mounting bracket 620. Mounting bracket 620 includes two opposing plates 620A and 620B each of which includes a hole through which mounting pin 618 is positioned. Apparatus 600 also includes a collar 622. Mounting pin 618 is positioned within collar 622 such that collar 622 rotates about mounting pin 618.

A leveling pin 624 is connected on a first end to the collar 622. A leveling pin 624 extends downward from the first end to a second end. As shown in FIG. 6, the leveling pin 624 is positioned within a sleeve 626. Connected to the second end of the leveling pin 624 is a spanner 628. Spanner 628 can be rotated to change a vertical position of leveling pin 624. In one embodiment, leveling pin 624 includes thread at the second end and spanner 628 also includes thread that engages the thread at the second end of leveling pin 624. Accordingly, when spanner 628 is rotated the vertical position of the leveling pin 624 is changed. A locknut 630 is connected to the second end of leveling pin 624 to lock and maintain a vertical position of leveling pin 624. The locknut 630 also engages the thread on the second end of leveling pin 624.

Apparatus 600 also includes a first strut brace 632 that is connected on a first end to sleeve 626. First strut brace 632 extends downwardly and at an angle from the first end to a second end. Attached to the second end of the first strut brace 632 is a pair of first opposing plates 634. Connected to the pair of first opposing plates 632 is a frame tab 640, which is attached to the first pair of opposing plates with a tab pin 642. Each of the first opposing plates 634 includes a hole within which tab pin 642 is positioned.

Frame tab 640 includes a vertical plate 640A and a horizontal plate 640B. Vertical plate 640A includes a plurality of holes 644 into which tab pin 642 can be positioned to connect frame tab 640 to the first pair of opposing plates 634. In the embodiment of apparatus 600 shown in FIG. 6, vertical plate 640A is positioned between the first pair of opposing plates 634. Frame tab 640 also includes a second vertical plate 640C that forms an angle with horizontal plate 640B for engaging with a vehicle frame as shown in FIG. 6.

Apparatus 600 further includes a second strut brace 636 which is connected on a first end to sleeve 626. Second strut brace 636 extends downwardly and at an angle from the first end to a second end. Attached to the second end of the second strut brace 636 is a pair of second opposing plates 638. Connected to the pair of second opposing plates 638 is a frame tab 648, which is attached to the second pair of opposing plates 638 with a tab pin 646. Each of the second opposing plates 638 includes a hole within which tab pin 646 is positioned.

Similar to frame tab 640, frame tab 648 includes a vertical plate 648A and a horizontal plate 648B. Vertical plate 648A includes a plurality of holes 650 into which tab pin 646 can be positioned to connect frame tab 648 to the second pair of opposing plates 638. In the embodiment of apparatus 600 shown in FIG. 6, vertical plate 648A is positioned between the second pair of opposing plates 638. Frame tab 648 also includes a second vertical plate 648C that forms an angle with horizontal plate 648B for engaging with a vehicle frame as shown in FIG. 6.

As those with skill in the art will appreciate, apparatus 600 provides flexibility with respect to the locations where apparatus 600 connects to vehicle frame 604. For example, adjusting the leveling pin 624 by rotating spanner 628 adjusts the horizontal height position of back portion 608 of beam 602. Furthermore, the vertical position of back portion 608 may also be changed by using different ones of the plurality of holes 644 and 650 to connect the pairs of opposing plates to the frame tabs 640 and 648. The plurality of holes 644 and 650 also provide flexibility with respect to the lateral location where frame tabs 640 and 648 are attached to frame 604.

In one embodiment of apparatus 600, the space between pairs of opposing plates 634 and 638 is selected to allow some variation in the width of frame 604. The space between the opposing plates is made wide enough to allow some movement of vertical plate 640A and 648A within the space between the pairs of opposing plates 634 and 638.

One feature of the embodiment of apparatus 600 illustrated in FIG. 6 is the angle at which strut braces 632 and 636 are positioned. As shown in FIG. 6, strut braces 632 and 636 are positioned at an angle and extend away from sleeve 626 to the pair of opposing plates to which they are connected. The position of strut braces 632 and 636, at an angle, provides clearance for the fifth wheel 616 on a vehicle when apparatus 600 is fully assembled and is being mounted on the vehicle.

Figure 7:
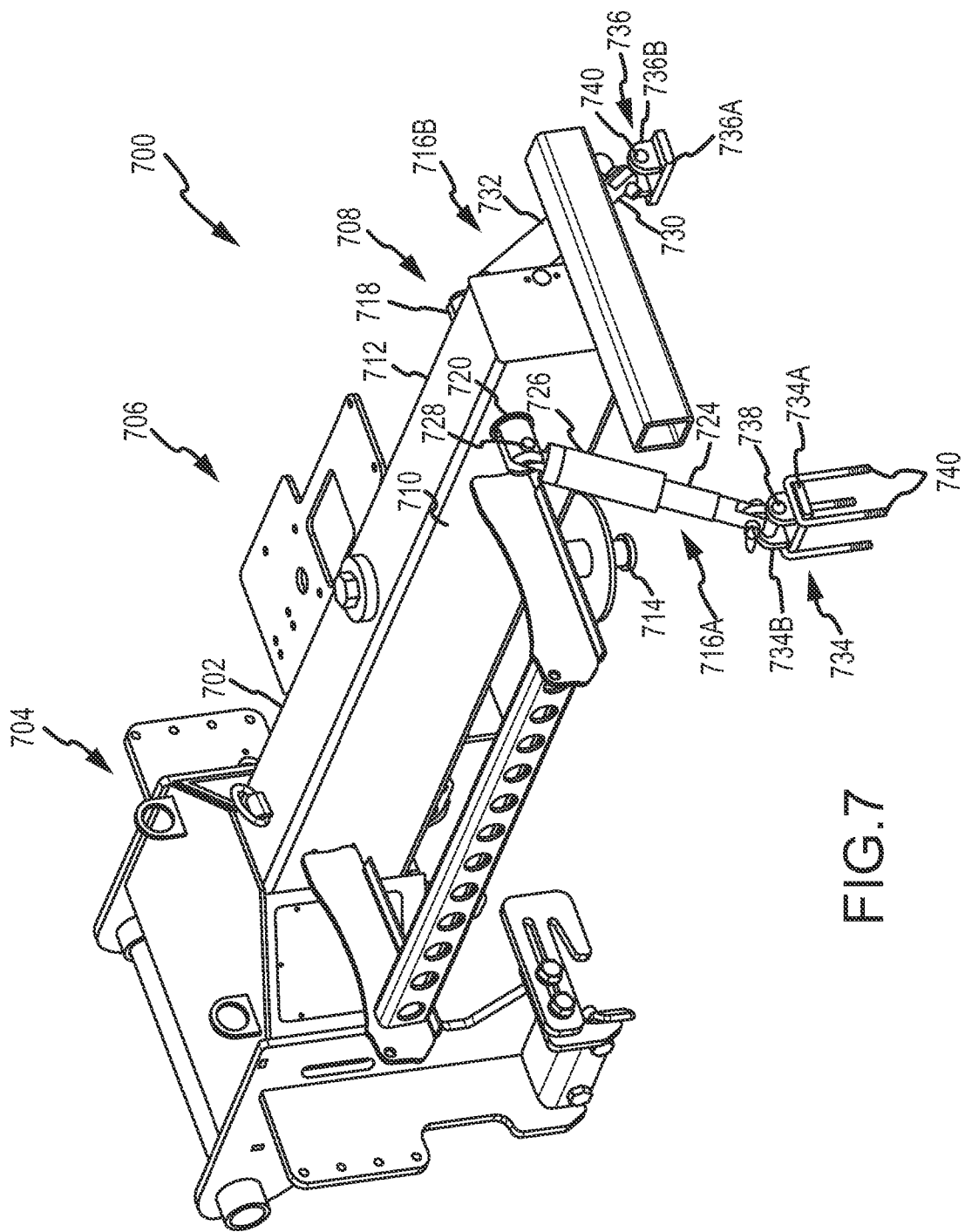
FIG. 7 is a perspective view of an apparatus for attaching to a vehicle with a fifth wheel in accordance with a third embodiment of the present invention.

FIG. 7 illustrates a perspective view of an apparatus 700 in accordance with a third embodiment of the present invention. Apparatus 700 includes a beam 702 with a frontward portion 704, middle portion 706, and rearward portion 708. Apparatus 700 also includes a kingpin 714 which is attached to the middle portion 706 of beam 702. The beam 702 also includes a first side surface 710 and a second side surface 712. Apparatus 700 is adapted to be connected to a vehicle that has a fifth wheel. In embodiments, a tow hitch can then be connected to apparatus 700 to allow the vehicle to tow other vehicles.

Apparatus 700 includes a pair of connecting assemblies 716A and 716B. The connecting assemblies 716A and 716B are used to connect the apparatus 700 to the frame of a vehicle. As shown in FIG. 7, apparatus 700 includes a mounting pin 718 connected to the back portion 708 of beam 702. The mounting pin 718 is substantially perpendicular to the beam 702. In the embodiment shown in FIG. 7, the back portion 708 of beam 702 includes a hole 720. The mounting pin 718 is connected to the back portion 708 of beam 702 by being position within hole 720. As will be appreciated by those with skill in the art, in other embodiments, mounting pin 718 may be connected to the back portion 708 of beam 202 using some other mechanism, e.g., mounting brackets connected to back portion 708.

Connecting assembly 716A includes a first leveling pin 724 which is positioned with a first leveling sleeve 726. The vertical position of the first leveling pin 724 may be adjusted by rotating the first leveling pin 724. In embodiments, first leveling pin 724 includes thread that engages thread within the leveling sleeve 726. By rotating the leveling pin 724 a horizontal position of the leveling pin 724 can be changed. As shown in FIG. 7, the first leveling sleeve 726 is connected to a first end of mounting pin 718 using a hitch pin 728.

The first leveling pin 724 is connected to a frame tab 734 using tab pin 738. Frame tab 734 is adapted to be attached to a vehicle frame using for example U-bolts 740. Frame tab 734 includes a horizontal plate 734A and a pair of vertical plates 734B. As shown in FIG. 7, the U-bolts 740 are positioned around horizontal plate 734A and around a vehicle frame.

Similarly, connecting assembly 716B includes a second leveling pin 730 which is positioned with a second leveling sleeve 732. The vertical position of the second leveling pin 730 may be adjusted by rotating the second leveling pin 730. In embodiments, first leveling pin 730 includes thread that engages thread within the leveling sleeve 732. By rotating the leveling pin 730 a horizontal position of the leveling pin 730 can be changed. As shown in FIG. 7, the second leveling sleeve 732 is connected to a second end of mounting pin 718 using a hitch pin (not shown).

The second leveling pin 730 is connected to a frame tab 736 using tab pin 740. Frame tab 736 is adapted to be attached to a vehicle frame using for example U-bolts. Frame tab 736 includes a horizontal plate 736A and a pair of vertical plates 736B. U-bolts are positioned around horizontal plate 736A and around a vehicle frame.

One feature of the embodiment of apparatus 700 illustrated in FIG. 7 is the angle at which first leveling pin 724 and second leveling pin 730 are positioned. As shown in FIG. 7, first leveling pin 724 and second leveling pin 730 are positioned at an angle and extend away from mounting pin 718. The position of first leveling pin 724 and second leveling pin 730, at an angle, provides clearance for the fifth wheel on a vehicle when apparatus 700 is fully assembled and is being mounted on a vehicle.

Figure 8:
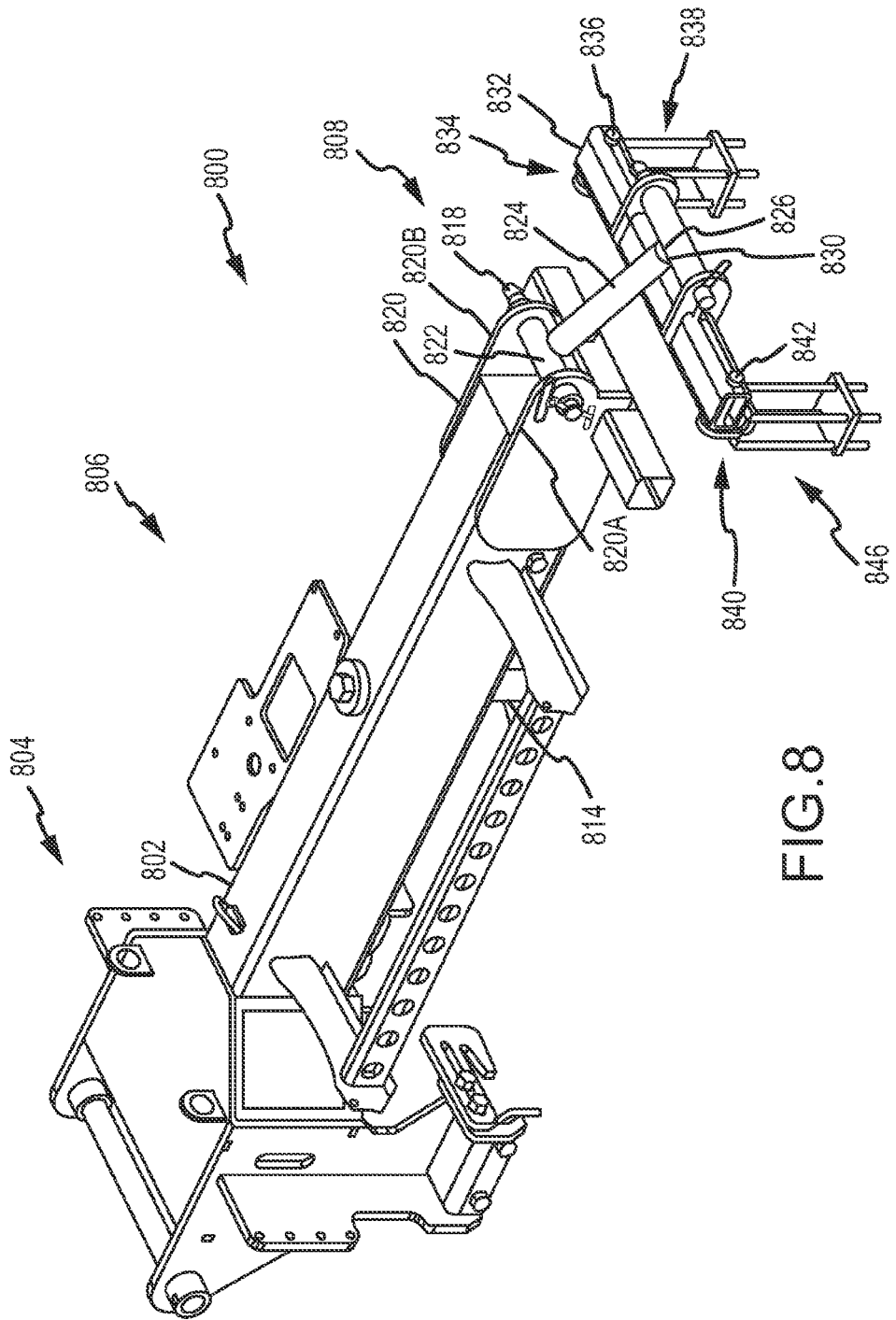
FIG. 8 is a perspective view of an apparatus for attaching to a vehicle with a fifth wheel in accordance with a fourth embodiment of the present invention.

FIG. 8 illustrates a perspective view of an apparatus 800 in accordance with a fourth embodiment of the present invention. Apparatus 800 includes a beam 802 with a frontward portion 804, middle portion 806, and rearward portion 808. Apparatus 800 also includes a kingpin 814 which is attached to the middle portion 806 of beam 802. Apparatus 800 comprises a mounting pin 818 that is connected to the rearward portion 808 of beam 802. Mounting pin 818 is substantially perpendicular to beam 802. In the embodiment shown in FIG. 8, mounting pin 818 is connected to rearward portion 808 of beam 802 using a mounting bracket 820. Mounting bracket 820 includes two opposing plates 820A and 820B each of which includes a hole through which mounting pin 818 is positioned. Apparatus 800 also includes a collar 822. Mounting pin 818 is positioned within collar 822 such that collar 822 rotates about mounting pin 818.

A leveling pin (not shown) is connected on a first end to the collar 822. The leveling pin extends downward from the first end to a second end. The leveling pin is positioned within a sleeve 824. Connected to the second end of the leveling pin is a spanner 826. Spanner 826 can be rotated to change a vertical position of the leveling pin. In one embodiment, the leveling pin includes thread at the second end and spanner 826 also includes thread that engages the thread at the second end of the leveling pin. Accordingly, when spanner 826 is rotated the vertical position of the leveling pin is changed. A locknut 828 is connected to the second end of leveling pin to lock and maintain a vertical position of the leveling pin. The locknut 828 also engages the thread on the second end of the leveling pin.

Apparatus 800 also includes a cross member 832 that is connected to sleeve 824. One end of cross member 832 is connected to a frame tab 840, which is attached to the cross member 832 with a tab pin 842. A second end of cross member 832 is connected to a frame tab 834, which is attached to the cross member 832 with a tab pin 836. Frame tabs 840 and 834 can be attached to a vehicle frame using U-bolts 846 and 838 respectively. As shown in FIG. 8, U-bolts 846 and 838 are positioned around a portion of frame tabs 840 and 834 and are also positioned around the frame of a vehicle.

Figure 9:
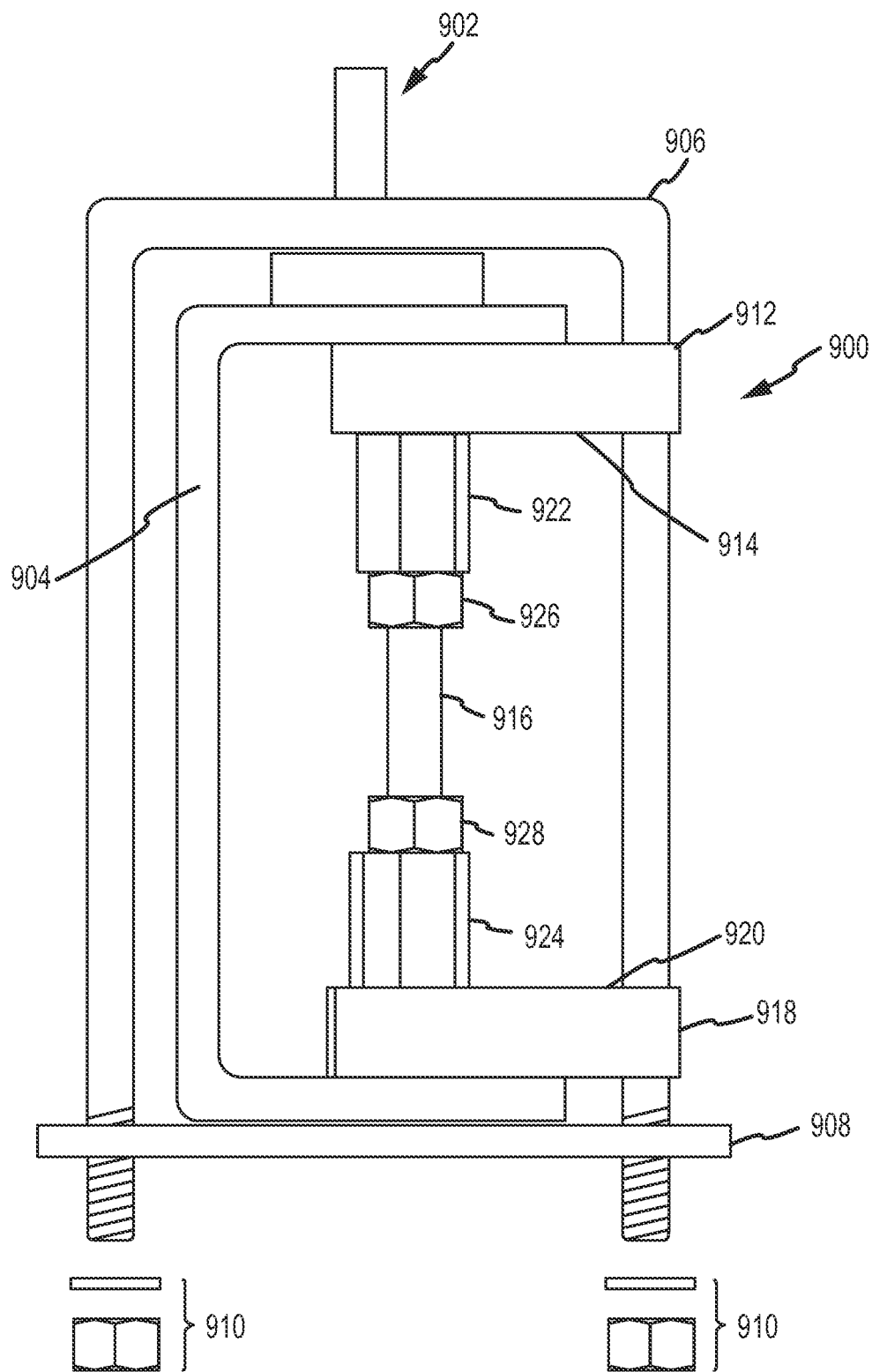
FIG. 9 is cross-sectional view of a protective assembly for preventing the deformation of a vehicle frame in accordance with an embodiment of the present invention.

FIG. 9 shows a cross-sectional view of a protective assembly 900 that prevents the deformation of a vehicle frame in accordance with an embodiment of the present invention. As those with skill in the art will appreciate vehicle frames are often made from channel iron. As described above, some embodiments of the present invention include connecting portions of an apparatus to a vehicle frame, for example using U-bolts. If for example, the U-bolts are tightened too tight they may deform the channel iron of the frame.

FIG. 9 shows a cross sectional view of a frame tab 902 that is connected to a frame 904 made from channel iron. Frame tab 902 is connected to frame 904 with a U-bolt 906, a plate 908, and nuts and washers 910. The protective assembly 900 is positioned within the channel iron of frame 904. The protective assembly includes a top plate 912 with a bottom surface 914. The top plate 912 is connected to a first end of a threaded rod 916. A bottom plate 918 is connected to a second end of the threaded rod 916 and includes a top surface 920 opposed to the bottom surface 914 of the top plate 912.

Protective assembly 900 also includes a first long nut 922 engaged with thread of the threaded rod 916 and positioned between the bottom surface 914 of the top plate 912 and the top surface 920 of the bottom plate 918. The first long nut 922 contacts the bottom surface 914 of the top plate 912. The first long nut 922 is adapted to be rotated and change the distance between the bottom surface 914 of the top plate 912 and the top surface 920 of the bottom plate 918.

Protective assembly 900 further includes a second long nut 924 engaged with the thread of the threaded rod 916 and positioned between the top plate 912 and the bottom plate 918. The second long nut 924 contacts the top surface 920 of the bottom plate 918 and is also adapted to be rotated and change the distance between the bottom surface 914 of the top plate 912 and the top surface 920 of the bottom plate 918.

The protective assembly also includes a first locknut 926 that is used to lock the first long nut 922 in a set vertical position. A second locknut 928 is used to lock the second long nut 924 in a set vertical position. Both locknuts 926 and 928 can be rotated to allow the long nuts 922 and 924 to be rotated and change the distance between the bottom surface 914 of the top plate 912 and the top surface 920 of the bottom plate 918.

As shown in FIG. 9, protective assembly 900 is positioned within frame 904 and prevents the U-bolt 906 from being tightened to an extent that would deform frame 904. The protective assembly 900 thus provides protection to vehicle frames.

Reference has been made throughout this specification to "one embodiment" or "an embodiment," meaning that a particular described feature, structure, or characteristic is included in at least one embodiment of the present invention. Thus, usage of such phrases may refer to more than just one embodiment. Furthermore, the described features, structures, or characteristics may be combined in any suitable manner in one or more embodiments.

One skilled in the relevant art may recognize, however, that the invention may be practiced without one or more of the specific details, or with other devices, structures, materials, etc. In other instances, well known structures, materials, or devices have not been shown or described in detail merely to avoid obscuring aspects of the invention.

While example embodiments and applications of the present invention have been illustrated and described, it is to be understood that the invention is not limited thereto. Various modifications, changes, and variations apparent to those skilled in the art may be made in the arrangement, operation, and details of the embodiments of the present invention disclosed herein, without departing from the scope of the claimed embodiments.

We claim:

1. An apparatus for connecting to a fifth wheel mounted on a vehicle, the apparatus comprising:
   an elongated beam with a forward portion, middle portion, and rearward portion, the beam being arrangeable in parallel with a longitudinal direction of the vehicle, wherein the beam comprises a first side surface and a second side surface parallel to the first side surface;
   a kingpin connected to the middle portion of the beam and adapted to engage the fifth wheel;
   a mounting pin with a first end and a second end, the mounting pin connected to the rearward portion of the beam and being substantially perpendicular to the elongated beam;
   a first strut brace with a first end and a second end;
   a first collar connected to the first end of the first strut brace, wherein the first end of the mounting pin is positioned within the first collar allowing the first collar and the first strut brace to rotate about the mounting pin;

a second strut brace with a first end and a second end;

a second collar connected to the first end of the second strut brace, wherein the second end of the mounting pin is positioned within the second collar allowing the second collar and the second strut brace to rotate about the mounting pin;

a first leveling assembly connected to the second end of the first strut brace; and a second leveling assembly connected to the second end of the second strut brace, wherein the first leveling assembly and the second leveling assembly are adapted to connect to a frame of the vehicle and are adapted to change the vertical position of the rearward portion of the beam.

2. The apparatus of claim 1, wherein the first strut brace is positioned at an angle and extends away from the first collar and wherein the second strut brace is positioned at an angle and extends away from the second collar.

3. The apparatus of claim 2, wherein the first leveling assembly comprises:

a first sleeve connected to the second end of the first strut brace and extending vertically;

a first leveling pin positioned within the first sleeve and extending vertically from a first end to a second end;

a first leveling spanner connected to the leveling pin and adjustable to change the vertical position of the first leveling pin; and a first frame tab connected to the second end of the first leveling pin with a first tab pin, wherein the first frame tab is rotatable about the first tab pin and is adapted to be connected to the frame; and wherein the second leveling assembly comprises:

a second sleeve connected to the second end of the second strut brace and extending vertically;

a second leveling pin positioned within the second sleeve and extending vertically from a first end to a second end;

a second leveling spanner connected to the second leveling pin and adjustable to change the vertical position of the second leveling pin; and a second frame tab connected to the second end of the second leveling pin with a second tab pin, wherein the second frame tab is rotatable about the second tab pin and is adapted to be connected to the frame.

4. The apparatus of claim 3, wherein the first leveling pin comprises thread that engages thread in the first spanner and the first spanner can be rotated to change the vertical position of the first frame tab and wherein the second leveling pin comprises thread that engages thread in the second spanner and the second spanner can be rotated to change the vertical position of the second frame tab.

5. The apparatus of claim 4, wherein the first leveling pin comprises a first lock nut that engages the thread of the first leveling pin and contacts the first spanner to maintain a vertical position of the first frame tab and wherein the second leveling pin comprises a second lock nut that engages the thread of the second leveling pin and contacts the second spanner to maintain a vertical position of the second frame tab.

6. The apparatus of claim 4, wherein the hole is one of a plurality of holes, wherein each of the plurality of holes is adapted to allow the mounting pin to slide into and out of the hole.

7. The apparatus of claim 3, wherein the first frame tab comprises a first vertical plate connected to a first horizontal plate and the second frame tab comprises a second vertical plate connected to a second horizontal plate.

8. The apparatus of claim 7, wherein the second end of the first leveling pin comprises a first notch into which the vertical plate of the first frame tab is positioned and wherein the second end of the second leveling pin comprises a second notch into which the vertical plate of the second frame tab is positioned.

9. The apparatus of claim 8, wherein the first tab pin is positioned within a hole in the second end of the first leveling pin and within a hole in the vertical plate of the first frame tab and wherein the second tab pin is positioned within a hole in the second end of the second leveling pin and within a hole in the vertical plate of the second frame tab.

10. The apparatus of claim 1, wherein the first end of the mounting pin comprises a first hole and the apparatus further comprises a first hitch pin positioned within the first hole to prevent the first collar from sliding off of the first end of the mounting pin and wherein the second end of the mounting pin comprises a second hole and the apparatus further comprises a second hitch pin positioned within the second hole to prevent the second collar from sliding off of the second end of the mounting pin.

11. The apparatus of claim 1, wherein the kingpin is adjustable to change its position.

12. The apparatus of claim 1, further comprising a hole through the rearward portion of the beam, wherein the mounting pin is positioned within the hole and the first end of the mounting pin extends beyond the first side surface and the second end of the mounting pin extends beyond the second side surface.

13. The apparatus of claim 1, further comprising at least one u-bolt for connecting the first frame tab to the frame and at least a second u-bolt for connecting the second frame tab to the frame.

14. The apparatus of claim 13, further comprising a protection assembly for preventing the frame from deforming when the at least one u-bolt is used to connect the first frame tab.

15. The apparatus of claim 14, wherein the frame is made from channel iron and the protection assembly is at least partially positioned within a channel of the channel iron, wherein the protection assembly comprises:

a top plate connected to a first end of a threaded rod and comprising a bottom surface;

a bottom plate connected to a second end of the threaded rod and comprising a top surface opposed to the bottom surface of the top plate;

a first long nut engaged with the thread of the threaded rod and positioned between the bottom surface of the top plate and the top surface of the bottom plate, wherein the first long nut contacts at least one of the bottom surface of the top plate or the top surface of the bottom plate, wherein the first long nut is adapted to be rotated and change the distance between the bottom surface of the top plate and the top surface of the bottom plate.

16. The apparatus of claim 15, wherein the first long nut contacts the bottom surface of the top plate and the protection assembly further comprises:

a second long nut engaged with the thread of the threaded rod and positioned between the top plate and the bottom plate, wherein the second long nut contacts the top surface of the bottom plate and is adapted to be rotated and change the distance between the bottom surface of the top plate and the top surface of the bottom plate.

17. An apparatus for connecting to a fifth wheel mounted on a tractor, the apparatus comprising:

an elongated beam with a forward portion, middle portion, and rearward portion, with the forward portion being disposable nearest a front portion of the tractor, wherein the beam comprises a first side surface and a second side surface parallel to the first side surface, wherein the rearward portion comprises a hole;

a kingpin connected to the middle portion of the beam and adapted to engage the fifth wheel;

a mounting pin with a first end and a second end, wherein the mounting pin is positioned within the hole in the rearward portion of the beam and the first end of the mounting pin extends beyond the first side surface and the second end of the mounting pin extends beyond the second side surface;

a first strut brace with a first end and a second end;

a first collar connected to the first end of the first strut brace, wherein the first strut brace is positioned at an angle and extends away from the first collar, wherein the first end of the mounting pin is positioned within the first collar allowing the first collar and the first strut brace to rotate about the mounting pin;

a second strut brace with a first end and a second end;

a second collar connected to the first end of the second strut brace, wherein the second strut brace is positioned at an angle and extends away from the second collar, wherein the second end of the mounting pin is positioned within the second collar allowing the second collar and the second strut brace to rotate about the mounting pin;

a first leveling assembly connected to the second end of the first strut brace; and a second leveling assembly connected to the second end of the second strut brace, wherein the first leveling assembly and the second leveling assembly are adapted to connect to a frame of the vehicle and are adapted to change the vertical position of the rearward portion of the beam.

18. The apparatus of claim 17, wherein the first leveling assembly comprises:

a first sleeve connected to the second end of the first strut brace and extending vertically;

a first leveling pin positioned within the first sleeve and extending vertically from a first end to a second end;

a first leveling spanner connected to the leveling pin and adjustable to change the vertical position of the first leveling pin; and a first frame tab connected to the second end of the first leveling pin with a first tab pin, wherein the first frame tab is rotatable about the first tab pin and is adapted to be connected to the frame; and wherein the second leveling assembly comprises:

a second sleeve connected to the second end of the second strut brace and extending vertically;

a second leveling pin positioned within the second sleeve and extending vertically from a first end to a second end;

a second leveling spanner connected to the second leveling pin and adjustable to change the vertical position of the second leveling pin; and a second frame tab connected to the second end of the second leveling pin with a second tab pin, wherein the second frame tab is rotatable about the second tab pin and is adapted to be connected to the frame.

* * * * *